United States Patent [19]

Scheuring

[11] Patent Number: 5,110,275
[45] Date of Patent: May 5, 1992

[54] EXTRUDER FOR THE PREPARATION OF PLASTIC MATERIAL WITH THE INTRODUCTION OF AT LEAST ONE FIBRE STRAND

[75] Inventor: Bernhard Scheuring, Stuttgart, Fed. Rep. of Germany

[73] Assignee: Werner & Pfleiderer GmbH, Fed. Rep. of Germany

[21] Appl. No.: 702,917

[22] Filed: May 20, 1991

[30] Foreign Application Priority Data

May 25, 1990 [DE] Fed. Rep. of Germany ....... 4016784

[51] Int. Cl.[5] ............................................. B29C 47/00
[52] U.S. Cl. .................................... 425/113; 366/76; 366/89; 425/114; 425/208; 425/376.1; 425/382.4
[58] Field of Search ............... 366/76, 80, 89; 425/97, 425/102, 113, 114, 204, 205, 207, 208, 209, 376.1, 382.4, DIG. 122

[56] References Cited

U.S. PATENT DOCUMENTS

| | | | |
|---|---|---|---|
| 3,409,711 | 11/1968 | Pashak et al. | 425/113 |
| 3,453,356 | 7/1969 | Kent, Jr. et al. | 425/113 |
| 3,746,489 | 7/1973 | Rizzi et al. | 425/204 |
| 4,405,399 | 9/1983 | Gibbons | 425/97 |
| 4,439,387 | 3/1984 | Hawley | 425/114 |
| 4,848,915 | 7/1989 | Fintel | 366/76 |
| 4,863,363 | 9/1989 | Haring | 425/208 |

FOREIGN PATENT DOCUMENTS

| | | |
|---|---|---|
| 3233416 | 5/1984 | Fed. Rep. of Germany ........ 366/76 |
| 988563 | 4/1965 | United Kingdom . |
| 1151964 | 5/1969 | United Kingdom . |

Primary Examiner—Jay H. Woo
Assistant Examiner—C. Scott Bushey
Attorney, Agent, or Firm—Laff, Whitesel, Conte & Saret

[57] ABSTRACT

An extruder with at least one bore, in which an extruder shaft is arranged to be rotatingly driven, has a device for introducing a glass fibre strand. To this effect the shaft is provided with an adjustable throttling device, upstream of which starts out an impregnating channel which opens again into the bore downstream of the throttling device seen in conveying direction, i.e. into a mixing zone, in which the fibre strand is cut into fibre sections. An especially intense impregnating of the fibres of the fibre strand is thus achieved.

10 Claims, 3 Drawing Sheets

EXTRUDER FOR THE PREPARATION OF PLASTIC MATERIAL WITH THE INTRODUCTION OF AT LEAST ONE FIBRE STRAND

FIELD OF THE INVENTION

The invention relates to an extruder for the preparation of plastic material comprising a housing having at least one bore with an axis, in which an extruder shaft is arranged to rotate, a feed orifice for the plastic material being provided at one end of the bore and a discharge orifice being provided at the other end of the latter, and an orifice being provided in the housing for introducing a fibre strand, in particular a glass fibre strand, into the bore in conveying direction following on a melting zone and at least ahead of the end of a mixing zone.

BACKGROUND OF THE INVENTION

In an extruder of the generic type known from British patent 1,151,964 a glass fibre strand is introduced into the bore at basically any place, the individual fibres being broken into sections of a predetermined length in the mixing zone. These broken sections are then mixed into the melted plastic material. A disadvantage of this development of an extruder or of the method used by it resides in that the individual fibres are not sufficiently wetted, i.e. the bonding of plastic material and fibres is not of sufficiently good quality. This leads to reduced mechanical properties in any object made from it.

It is known from British patent 988,563 to soak such glass fibre strands—also known as glass silk hanks or rovings—in a melt of the thermoplastic material to be processed or prepared. To this effect this publication cites the above-mentioned method known from British patent 1,151,964 for introducing endless glass fibre strands into plastic material melts.

U.S. Pat. No. 4,439,387 teaches to arrange an apparatus, in which one or several glass fibre strands are coated with plastic material, downstream of the discharge orifice of an extruder for preparing, and more particularly for melting plastic material. These glass fibre strands are introduced laterally into a coating channel by way of inlet nozzles. In this coating channel they pass at least one cam, by which is ensured that the endless fibre strands sufficiently contact the thermoplastic material. They then remain as a central reinforcement inside a compound composite structure.

SUMMARY OF THE INVENTION

It is an object of the invention to embody an extruder of the above generic type such that it allows the fabrication of plastic materials reinforced by short fibres having particularly good mechanical properties.

In accordance with the invention this object is achieved in that the orifice serving to introduce the fibre strand opens into an impregnating channel, which is provided in the housing and which starts out from the bore downstream of the melting zone—seen in conveying direction—and—again seen in conveying direction—downstream of its beginning opens with its end into the mixing zone. Due to the measures according to the invention it is achieved that part of the melt of the thermoplastic material leaves the bore and serves to coat the endless fibre strand or to wet the individual fibres in the impregnating channel. These fibres thus wetted are then entered into the mixing zone together with this melt, where the individual endless fibres are mixed into the melt by the regularly arranged mixing and kneading elements and cut into fibre sections of predetermined length. As a rule, the fibres are glass fibres, i.e. inorganic fibres; they may, however, also be organic fibres and carbon fibres. As a result of the fact that the fibres have been completely wetted with melt prior to being mixed and spread in the melt, the shearing forces exercised on the melt in the mixing zone cause a minor destruction of the fibres. The melt between the individual fibres has a lubricating effect reducing the friction between neighbouring fibres and thus any mutual destruction. These impregnated fibre strands only still have to be separated and distributed homogenously in the melt by the mixing and kneading elements, which ensures an especially high content of fibres in the melt and which is altogether an exceptionally gentle treatment of the fibres.

A pressure necessary and sufficient to impregnate the fibres is achieved, when in accordance with an advantageous further development of the invention a throttling device is provided in the bore between the beginning and the end of the impregnating channel and exercises a corresponding back pressure forcing a corresponding part of the melt of the prepared thermoplastic material into the impregnating channel. Downstream of the throttling device, seen in conveying direction, the melt flows off comparatively quickly after a corresponding pressure relief, so that working of the fibre sections into the melt is particularly facilitated. In highly functional manner the throttling device is adjustable, whereby an optimization of the pressure conditions and thus of the wetting of the fibres in the impregnating channel can be attained. In a particularly advantageous embodiment the throttling device has a throttling gap, which extends in the direction of the axis of the bore and of which the gap length can be modified by displacing the extruder shaft relative to the housing. Such a throttling device avoids movable parts to be provided on the housing to modify the throttling cross-section.

The wetting of the fibres or of the fibre strands in the impregnating channel may further be affected or optimized by the impregnating channel having a variable cross-section according to an advantageous further development of the invention. The pressure conditions in the impregnating channel and the quantity of melt entered can thus be influenced. Such a modification of the cross-section is ensured in favourable manner by the impregnating channel being defined towards the outside of the housing by an adjustable limiting wall. When the latter is adjusted approximately radially relative to the axis of the bore, the cross-section of the channel increases or decreases.

It is of further advantage that at least one expanding cam is provided in the impregnating channel, over which the at least one fibre strand passes. On the one hand this serves to unravel the fibre strand so that the individual fibres are more intensely exposed to the melt. Further, a wedge effect locally increasing the pressure of the melt occurs right before the fibre strand bears on the expanding cam and results in an even more intense wetting of the fibres. A further amelioration is achieved when at least one expanding cam is provided to be adjustable in a direction at right angles to the axis of the bore. It is then of particular advantage, if at least two expanding cams, which are arranged one behind the other in conveying direction, are provided to be adjustable relative to each other at right angles to the axis of the bore. The fibre strand is alternately passed and deflected over such expanding cams.

In an advantageous manner the orifice to introduce the fibre strand is formed by an inlet nozzle with a nozzle-like inlet channel, of which the narrowest cross-section corresponds to the cross-section of the fibre strand plus some guide clearance. Simultaneously this serves to seal the impregnating channel outwards, i.e. no melt can emerge in this area.

Further details, advantages and features of the invention will become apparent from the ensuing description of an example of embodiment taken in conjunction with the drawings.

DESCRIPTION OF THE PREFERRED EMBODIMENT

Figure 1:
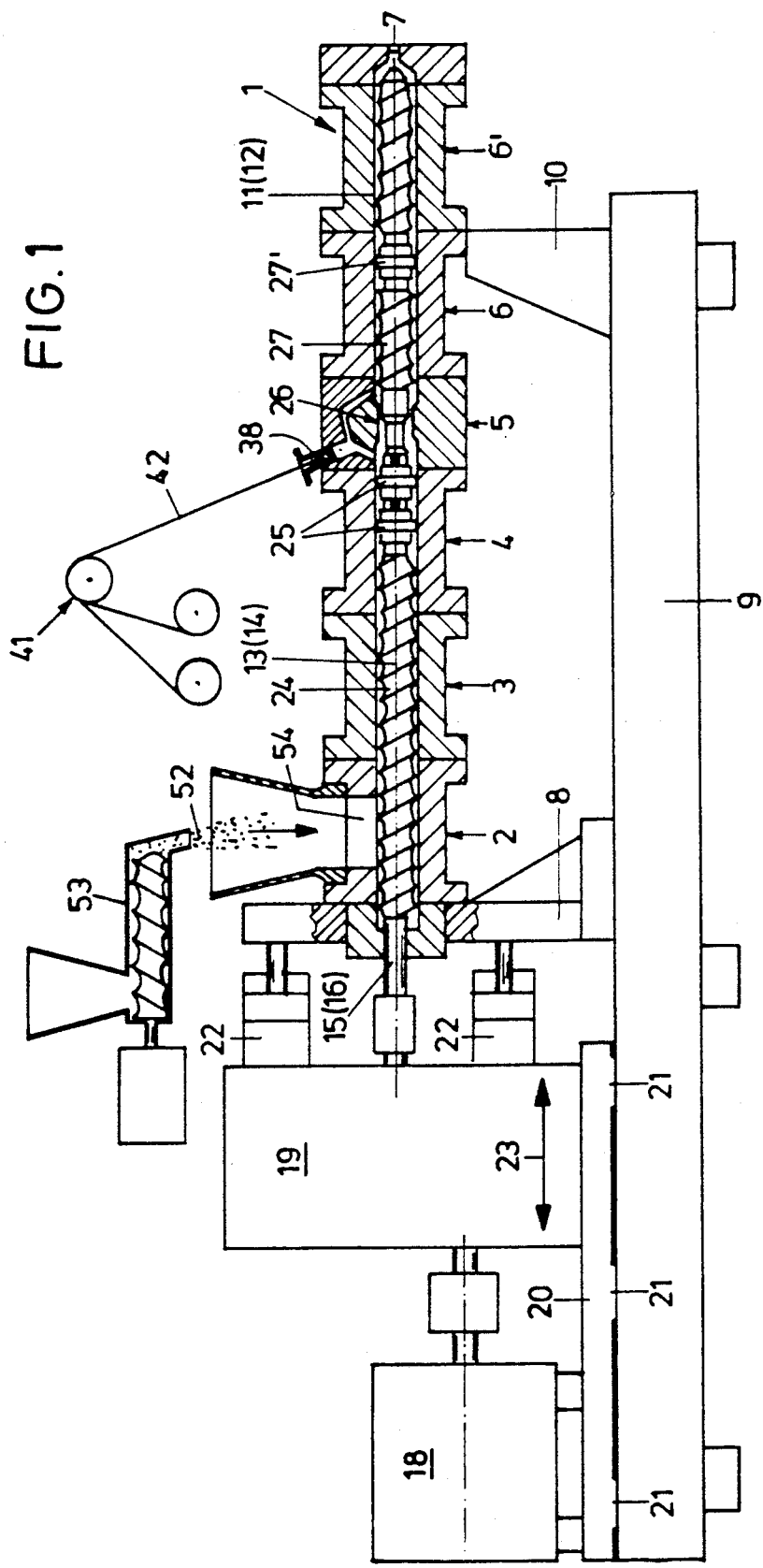
FIG. 1 is a partly cut away diagrammatic representation of an extruder.

The extruder shown in the drawing is a two-shaft extruder. It has a housing 1 in conventional manner consisting of several housing sections one screwed to the other. Individual functions are associated with these housing sections. A feed zone 2 is provided followed by a conveying zone 3. The conveying zone 3 is in turn followed by a melting zone 4, subsequent to which comes a fibre strand introducing zone 5. The fibre strand feed zone 5 is followed by a mixing zone 6, downstream of which are arranged a discharge zone 6' and a discharge opening 7.

By way of a support 8 the housing 1 is connected with a base plate 9 in the vicinity of its feed zone 2 in a manner not to be displaceable horizontally or vertically. In the vicinity of its mixing zone 6 the housing 1 is supported relative to the base plate 9 by way of a further support 10.

The housing 1 has two housing bores 11, 12, of which the axes 13, 14 extend parallel to each other. The bores 11, 12 penetrate each other over a substantial part of their length in conventional manner. Extruder shafts 15, 16 are arranged in the bores 11, 12 and are driven to rotate in the same direction, i.e. in the same direction of rotation, according to the rotational direction arrows 17 in FIG. 3. Consequently, the shafts 15, 16 do not mesh over their full length.

The shafts 15, 16 are driven by a motor 18 via a transmission 19. The motor 18 and the transmission 19 are arranged on a carriage 20 supported on the base plate 9 by way of sliding bearings 21. The transmission 19 is connected to the support 8 by way of adjusting drives 22 to be hydraulically actuated, for instance in the form of piston cylinder drives to be hydraulically operated, and can be displaced by means of the adjusting drives 22 relative to the support 8 and thus relative to the housing 1 in the adjusting direction 23, which is parallel to the direction of the axes 13, 14, attention being drawn for completion to the fact that the axes 13, 14 also are the axes of the shafts 15 or 16. The shafts 15, 16 are axially tightly connected with the transmission 19, so that the shafts 15, 16 are displaced in the direction of the axes 13, 14 relative to the housing 1 upon a displacement of the motor 18 and of the transmission 19 in the direction 23.

In the vicinity of the feed zone 2 and of the conveying zone 3 right to the beginning of the melting zone 4 the shafts 15, 16 are in the form of screw elements. In the melting zone 4 they are followed by plasticizing elements 25 in conventional manner formed by kneading disks. A throttling device 26 is provided in the fibre strand introducing zone 5. Screw elements 27 and kneading elements 27' altogether forming mixing and kneading elements are in turn provided in the mixing zone 6.

The throttling device 26 is in the form of a so-called axial throttle actuated by the above-described displacement of the shafts 15, 16 relative to the housing 1. In the fibre strand introducing zone 5 in the housing one throttling sleeve 28 is to this effect provided in each of the bores 11 or 12, respectively, the diameter D28 of which sleeve is smaller than the diameter D11 of the bore 11 or the bore 12 in the remaining areas. Each shaft 15 or 16, respectively, has a throttling core 30 located downstream in the conveying direction 29 and followed by the screw element 27. This throttling core 30 has a diameter d30 which is slightly less than the diameter D28 of the throttling sleeve 28. When the throttling core 30 is drawn into the throttling sleeve 28 by the described displacement of the corresponding shaft 15 or 16, then a throttling gap 31 forms between the two of which the axial length is variable, whereby differing throttling effects are produced. Ahead of the throttling core 30 seen in the conveying direction 29 a shaft section 32 is formed, which is tapered in relation to the throttling core 30 and of which the diameter d32 is clearly smaller than the diameter d30, so that no throttling of the melt of a thermoplastic material coming from the melting zone 4 occurs in the area where this shaft section 32 and the throttling sleeve 28 overlap. Another shaft section 33 of a larger diameter d33 than that of the shaft section 32 is arranged between the plasticizing elements 25 and the tapered shaft section 32. In this area the bore 11 or 12, respectively, has again its normal diameter D11, so that a transition section 34 is formed tapering in the conveying direction 29 towards the throttling sleeve 28.

An impregnating channel 35 starts out from this transition section 34 and, downstream of the throttling device 26, opens again into the bore 11 or 12, respectively, where the screw element 27 is located. Coming from the top side of the housing 1 a fibre strand introducing channel 37 opens into the impregnating channel 35 directly behind the beginning 36 of the impregnating channel 35 in the transition section 34 and houses an inlet nozzle 38, which has a nozzle-like inlet channel 39 tapering towards the impregnating channel 35. Outside the housing 1 and upstream of the inlet nozzle 38 a heating 40 is arranged, upstream of which is arranged an unwinding device 41 for a fibre strand 42 fed to the inlet nozzle 38 through the heating 40.

In the area behind the introducing channel 37 the impregnating channel 35 is bent in the shape of a double S, i.e. it extends approximately sinusoidal, each wave peak forming a so-called expanding cam 43, 44 or 45, 45', respectively, over which the fibre strand 42 is passed.

While the lower limiting wall 46 of the impregnating channel 35 with the expanding cams 45, 45' is stationary within the housing, the upper limiting wall 47 of the impregnating channel 35 with the upper expanding cams 43, 44 is adjustable in height relative to the impregnating channel 35, so that the width of the latter can be modified. This possibility of adjusting is achieved in that the upper limiting wall is formed on a housing portion 48, which can be adjusted in height relative to the housing 1 according to the directional arrow 50 by means of an adjusting spindle 49 only shown in FIG. 2. The adjusting spindle 49 is supported by an abutment 51 which is in stationary connection with the housing 1. Such adjustments also change the overlapping of the expanding cams 43, 44 with the two neighbouring expanding cams 45, 45'.

Granular plastic material 52 is supplied to the feed zone 2 from a feed device 53 via a feed orifice 54 and is melted in the melting zone 4. Depending on how the throttling device 26 is adjusted, i.e. depending on the axial position of the throttling core 30 relative to the throttling sleeve 28, part of the molten thermoplastic material is forced into the impregnating channel 35, where it comes into contact with the fibre strand 42 introduced through the inlet nozzle 38 and the introducing channel 37. During this, the individual fibres 55 unravelled upon passing the expanding cams 43, 44, 45, 45' as can be seen from FIG. 3 are wetted with the molten plastic material. This wetting or impregnating effect is even supported in that a wedging takes place between the expanding cams 43, 44 and 45, 45' and the individual fibres 55, which is indicates by corresponding pressure fields 56 in FIG. 2. The more the expanding cams 43, 44 overlap the expanding cams 45, 45', the more intense is the weding and thus the impregnating effect. This can also be affected by the possibility of adjusting the upper limiting wall 47 relative to the lower limiting wall 46 of the impregnating channel 35. Further, the impregnating effect can be influenced by the pressure of the molten plastic material in the impregnating channel 35, which pressure can be substantially modified by the above-described adjustment of the throttling device 26.

After its exit from the end 57 of the impregnating channel 35 the unravelled and impregnated fibre strand 42 is gripped by the corresponding screw element 27, it is drawn in and cut into pieces, so that the individual fibre sections are mixed into the molten plastic material in the mixing zone 6.

Glass fibres, also called glass silk hanks or rovings, are used as fibre strands 42. These glass fibre strands consist of endless spider threads also designated as fibres 55 in the above. In turn, these spider threads are bundled filaments, i.e. elementary threads not connected with each other. In dependence on the desired fibre content of the melt the drawn-in fibre strand can be formed by joining several individual fibre strands of similar or different thread count, as indicated in FIG. 1.

Figure 2:
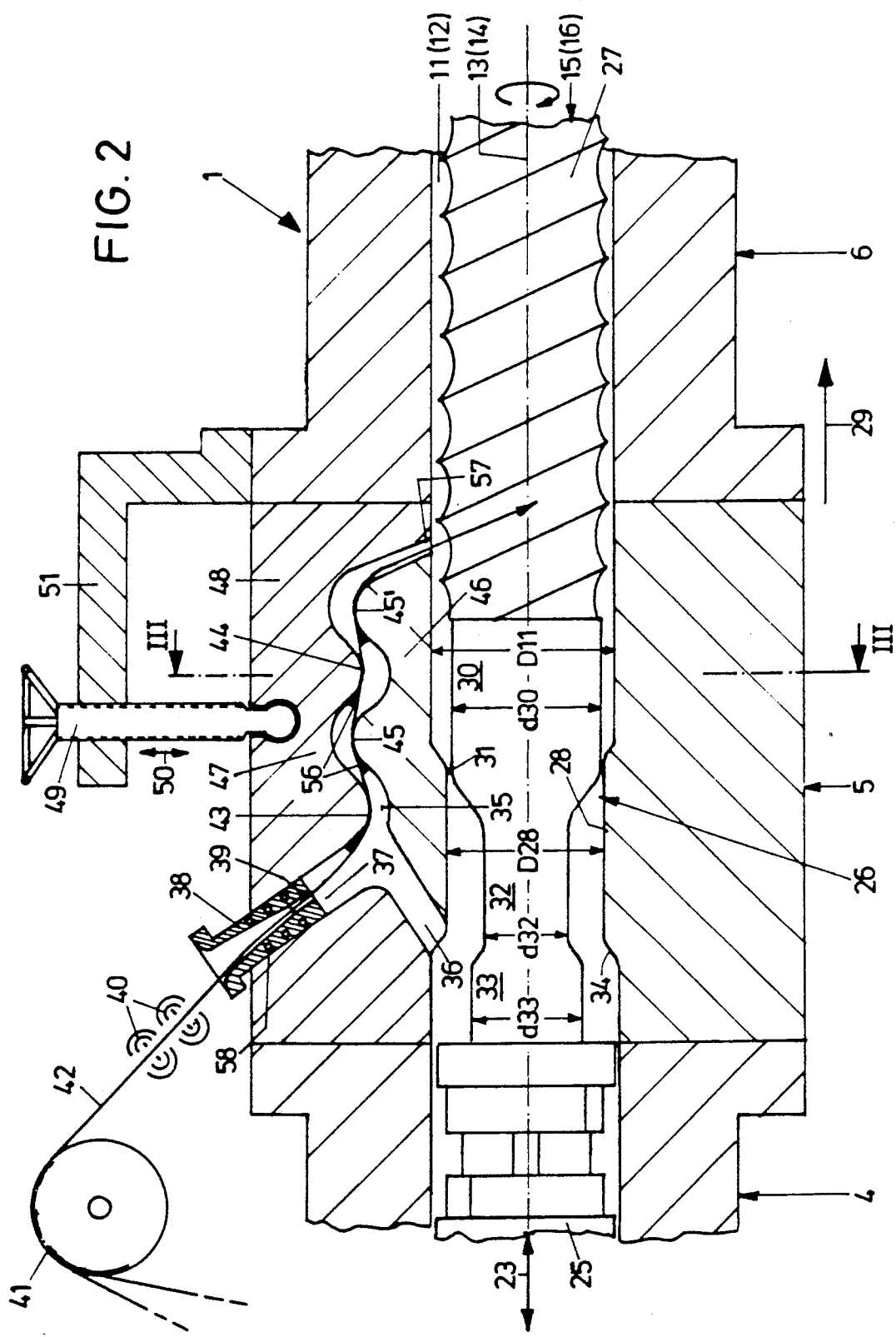
FIG. 2 is a partial representation of a fibre strand feed zone on an enlarged scale in relation to FIG. 1.
Figure 3:
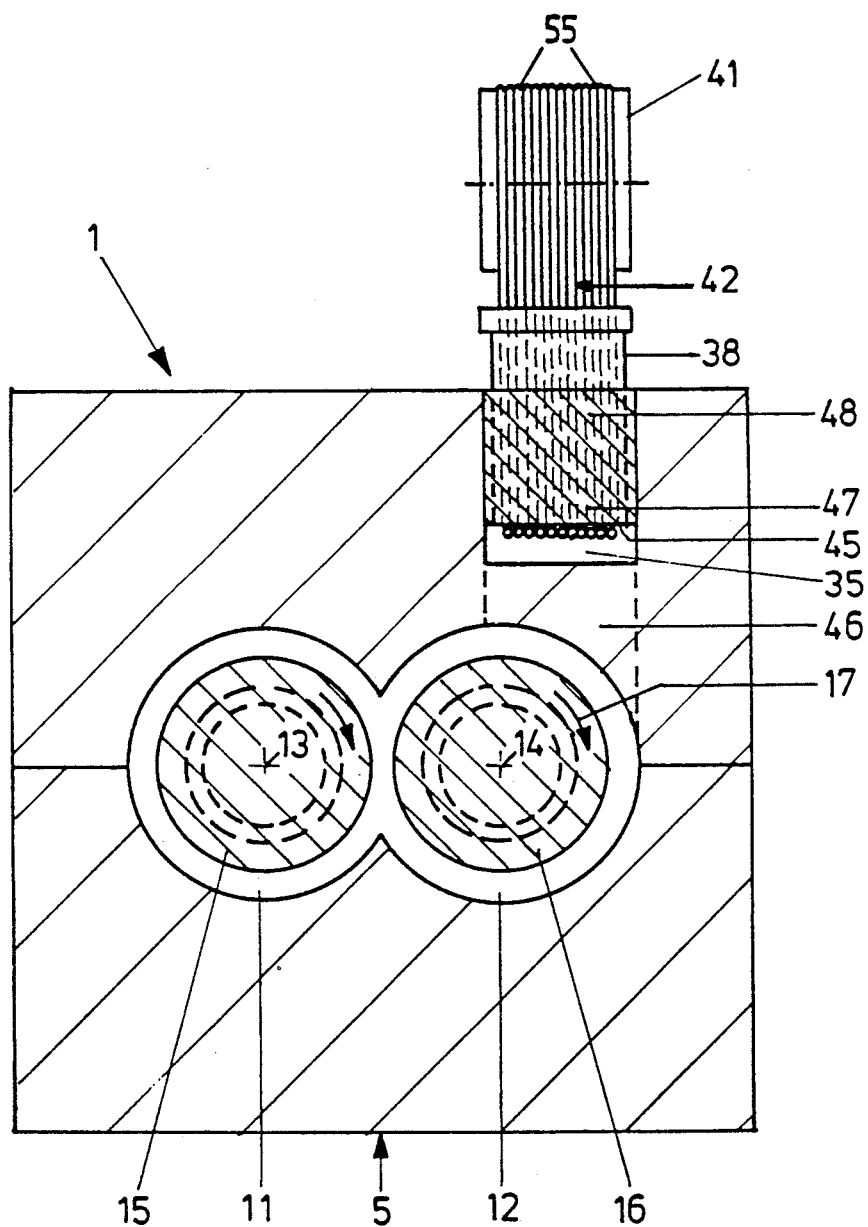
FIG. 3 is a cross-section through the fibre strand feed zone along section line III—III in FIG. 2.

The inlet nozzle 38 is screwed into the fibre strand introducing channel 37, as can be taken from FIG. 2, so that it can be exchanged corresponding to the fibre strands 42 used in each case; the narrowest cross-section of the inlet channel 39 must in each case be chosen such that corresponds to the cross-section of the fibre strand 42 plus a small guiding clearance. This is where a certain slowing-down effect is exercised on the fibre strand 42, which is also the case at the unwinding device 41, so that the fibre strand 42 is pulled over the expanding cams 43, 44, 45, 45' with sufficient contact force. The inlet nozzle 38 has conduits 58 for guiding a temperature-regulating medium to influence the sealing and slowing-down effect.

Due to the fact that the fibre strand is heated by means of the heating 40 prior to entering the housing 1 it is prevented that the melt contacting the fibre strand 42 freezes on its surface.

What is claimed is:

1. An extruder for forming reinforced plastic material comprising:
    a housing (1) having at least one housing bore (11, 12) with an axis (13, 14);
    a rotatably drivable extruder shaft (15, 16) arranged in each of said at least one housing bore (11, 12);
    a feed orifice (54) for the plastic material provided at a first end of said at least one housing bore (11, 12);
    a discharge orifice (7) provided at a second end of said at least one housing bore (11, 12) and downstream of said feed orifice (54);
    a melting zone (4) arranged downstream of said feed orifice (54);
    a mixing zone (6) arranged downstream of said melting zone (4);
    fibre feeding means comprising an orifice provided in the housing (1) for introducing a fibre strand (42), and leading into said at least one housing bore (11, 12) downstream of said melting zone (4) and upstream of a downstream end of said mixing zone (6);
    wherein the orifice for introducing the fibre strand (42) opens into an impregnating channel (35), which is provided in the housing (1) and has a beginning (36) leading radially outward from said at least one housing bore (11, 12) downstream of said melting zone (4) and which impregnating channel (35) has an end (57) downstream of said beginning (36), said end (57) opening into said at least one housing bore (11, 12) at said mixing zone (6).

2. An extruder according to claim 1, wherein a throttling device (26) is provided in said at least one housing bore (11, 12) between said beginning (36) and said end (57) of said impregnating channel (35).

3. An extruder according to claim 2, wherein said throttling device (26) is adjustable.

4. An extruder according to claim 3, wherein said throttling device (26) has a throttling gap (31), which extends in a direction of said axis (13, 14) of said at least one housing bore (11, 12) and of which a gap length is adjustable by displacement of said extruder shaft (15, 16) relative to said housing (1).

5. An extruder according to claim 1, wherein said impregnating channel (35) has an adjustable cross-section.

6. An extruder according to claim 5, wherein said impregnating channel (35) is defined by an adjustable limiting wall (47) towards an outside of said housing (1).

7. An extruder according to claim 1, wherein at least one expanding cam (43, 44, 45, 45') is formed in said impregnating channel (35), over which cam is passed the fibre strand (42).

8. An extruder according to claim 7, wherein at least one expanding cam (43, 44) is provided to be adjustable in a direction at right angles to said axis (13, 14) of said at least one housing bore (11, 12).

9. An extruder according to claim 8, wherein at least two expanding cams (43, 44; 45, 45') arranged one behind the other in a downstream direction are provided to be adjustable relative to each other at right angles to said axis (13, 14) of said at least one housing bore (11, 12).

10. An extruder according to claim 1, wherein said orifice for introducing the fibre strand (42) is formed by an inlet nozzle (38) with an inlet channel (39).

* * * * *